J. MOULTON.
Vulcanizing Apparatus.
No. 84,209.
Patented Nov. 17, 1868.
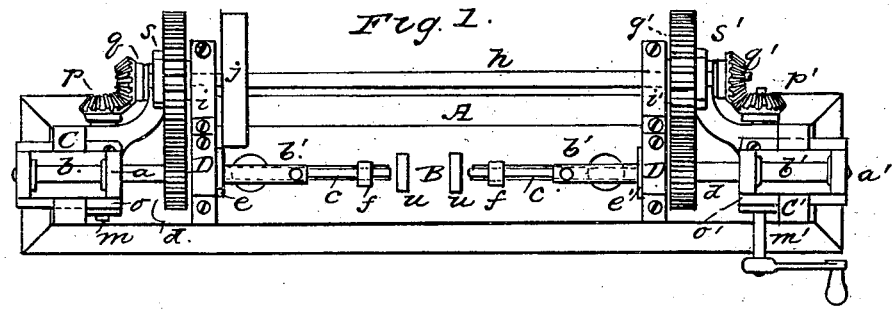
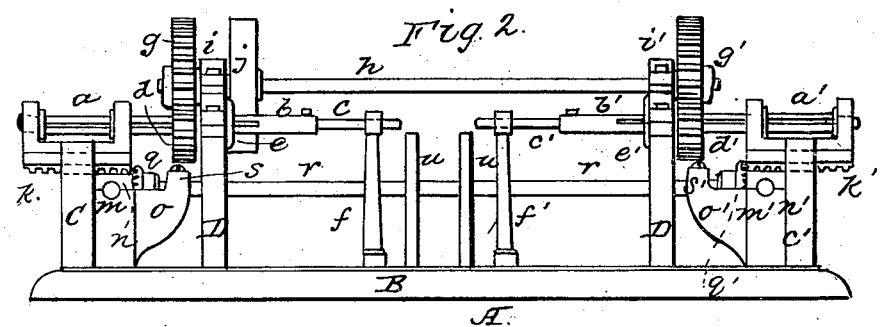
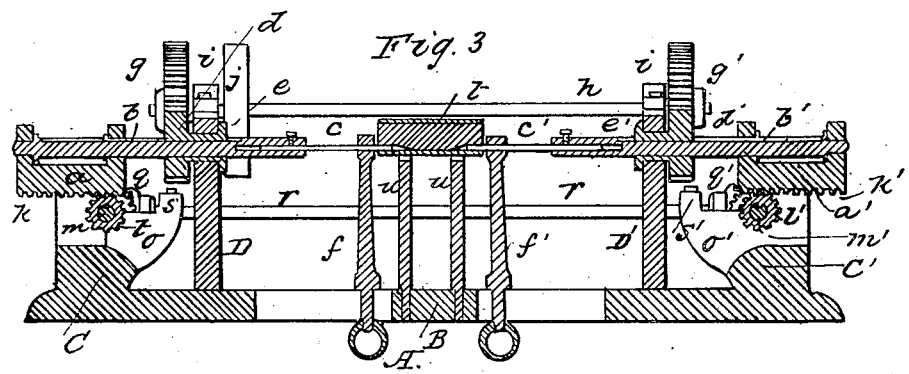
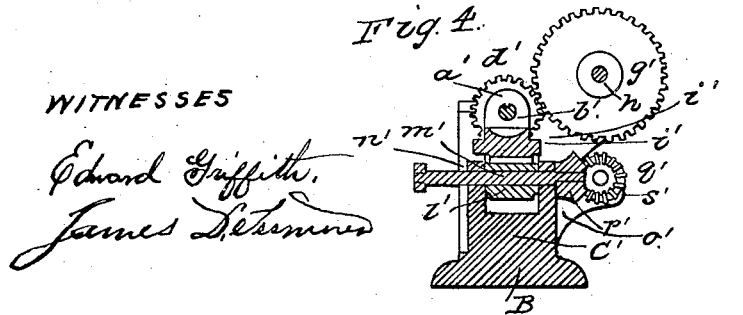
WITNESSES
Edward Griffith.
James Desmmes
INVENTOR
Joel Moulton
by his attorney,
Frederick Curtis,
N. PETERS, PHOTO-LITHOGRAPHER, WASHINGTON, D C.

JOEL MOULTON, OF BOSTON, MASSACHUSETTS.

Letters Patent No. 84,209, dated November 17, 1868.

IMPROVED METHOD OF DETACHING RUBBER ARTICLES FROM THE MOULDS IN WHICH THEY ARE VULCANIZED.

The Schedule referred to in these Letters Patent and making part of the same.

*To all to whom these presents shall come:*

Be it known that I, JOEL MOULTON, of Boston, in the county of Suffolk, and State of Massachusetts, have made an invention of a new and useful Machine Designed for Loosening or Detaching Elastic Rolls or Tubes from the Metallic Shell in which they are Vulcanized; and do hereby declare the following to be a full, clear, and exact description thereof, due reference being had to the accompanying drawings, making part of this specification, and in which—

Figure 1 is a plan,

Figure 2, a front elevation,

Figure 3, a vertical central and longitudinal section, and

Figure 4, a vertical and transverse section of my improved machine, the latter figure being taken through the gears for effecting the longitudinal movements of the clearing-rods, to be hereinafter described.

The process of vulcanizing India-rubber articles is now so generally understood that any reference to this process is considered hardly necessary in this specification, which is addressed chiefly to persons accustomed to the manufacture of vulcanized-rubber articles in general. Such persons are aware that in the manufacture of elastic rolls, such as are intended for use in clothes-wringers, for instance, the rolls adhere very tenaciously to the interior of the metallic cylinder or mould in which they are "vulcanized," and require the expenditure of considerable manual labor, and much time, to loosen this hold, before they can be expelled from the mould.

The value of a machine for effecting this object has suggested itself to me in the manufacture of elastic rolls, for the invention of a new manufacture of which Letters Patent of the United States of America were issued to me on the 10th day of March, 1868.

The machine constituting the subject of my present application, consists in the employment of two rotating cylindrical rods, which I term "clearers," supported horizontally in a suitable frame, in longitudinal alignment with each other, and in such manner as to be capable of being advanced or retracted with respect to each other and to the vulcanizing-mould or shell and its contents, as hereinafter explained, the revolution of the clearing-rods being effected by a dually-arranged set of gears and pinions, supported upon suitable shafts, and operating in manner as hereinafter explained.

In the drawings above referred to as accompanying this specification, and illustrating my invention, the frame of the machine is shown at A as composed substantially of a bed-plate or base, B, and four standards or uprights, C C' D D', arranged at each end of such bed-plate, as represented, it being understood at the start, that the two halves of the machine, taken from a central line, are exact counterparts of each other.

A sliding carriage or head-stock, $a$ or $a'$, is supported in guides, formed upon the upper part of each end standard, C or C', of the frame A, in such manner as to be susceptible of free longitudinal movements therein or thereupon.

Each of the said head-stocks carries a shaft or mandrel, $b$ or $b'$, properly applied thereto, in the manner of ordinary lathes, such shafts extending through and being supported by the inner standards, D D', of the frame A, and terminating a short distance beyond the inner faces of such standards.

Each of the shafts or mandrels, $b$ or $b'$, carries at its inner ends, a cylindrical rod or clearer, $c$ or $c'$, such rods being applied to the mandrels, preferably, in such manner as to vary the respective distance between the extremities of each, in order to accommodate the machine to objects of varying lengths.

The mandrels, $b$ or $b'$, and with them the clearers, $c$ or $c'$, are put in revolution by means of pinions, $d$ or $d'$, applied to such mandrels between the standards C and D and C' and D', and preferably in close proximity to the inner ones, D D', a hub or shank, $e$ or $e'$, making part of each pinion, extending through the said standards D D', and serving to prevent any longitudinal movement of the pinions.

The connection between the pinions and their shaft is the ordinary spline-and-groove connection, well understood by all mechanics, which permits of sliding movements of the mandrels through such pinions, but which insures their revolution therewith.

For perfect security, and means of support, the inner ends of each clearing-rod, $c$ or $c'$, extend through a post, $f$ or $f'$, applied to the base, B, of the machine-frame, and between the standards D D thereof, as represented, such parts being applied to the base in such manner as to be capable of longitudinal adjustment thereupon, in order that their position may be varied with respect to the length of the vulcanizing-mould.

The pinions $d$ and $d'$ mesh into and are driven by spur-gears, $g$ $g'$, supported upon each end of a long shaft, $h$, which is supported in bearings or boxes making part of lateral extensions or brackets, $i$ $i'$, of the standards D D', before mentioned, and in rear of the clearers $c$ $c'$, the shaft $h$ being in turn put in revolution by means of a driving-pulley, $j$, and constituting the driving-shaft of the machine.

The longitudinal-sliding movements of the head-stock, $a$ or $a'$, and the mandrels and clearing-rods, are effected as follows: A toothed rack, $k$ or $k'$, is applied to the under side of each head-stock, and extending preferably its entire length, such rack engaging with a pinion, $l$ or $l'$, fixed to a horizontal shaft, $m$ or $m'$, revolving in bearings, $n$ or $n'$, applied to the upper part of extensions, $o$ or $o'$, of the standards C C', such shafts being disposed below the head-stocks and mandrels, and at right angles thereto, as shown in fig. 1 of the accompanying drawings.

The shafts $m$ $m'$ extend a short distance rearward, and are each provided at such rear ends with a bevelled gear, $p$ or $p'$, such gears engaging with twin gears, $q$ or $q'$, applied to opposite ends of a long shaft, $r$, that is disposed below the shaft $h$, before mentioned, and, like it, extending from end to end of the machine-frame, the said shaft $r$ being supported in boxes or bearings, $s$ or $s'$, suitably affixed to the bed-plate B, or making part of the extension $o$ $o'$, before alluded to.

The object of connecting the shafts, $m$ or $m'$, and gears, $p$ $p'$ $q$ $q'$, in manner as described, is to insure a similarity of movement of the head-stocks and their mandrels.

One of the shafts, $m$ or $m'$, should be provided, at its front extremity, with a crank, or other device for imparting rotary motion to it, in either direction, as occasion or the functions of the machine require.

The operation of the above-described machine is as follows: The vulcanizing-mould or cylinder, containing the perfected tube or other object, (and which is shown at $t$ in the drawings,) is to be deposited upon a cradle or crutches, $u$ $u$, fixed to the bed-plate B, and between the posts $f$ $f'$, the cradle or crutches being of such a height as to insure the certainty of the clearing-rods $c$ $c'$ impinging against the inner circumference of the vulcanizing-mould, and between such circumference and the elastic material or object enclosed by it.

The mould and its roll having been deposited as described, the ends of the clearers $c$ $c'$ are next to be inserted between the roll or other elastic body and the inner periphery or surface of the mould, and the machine put in operation, it being understood that the mould is to be guided and partially supported in one of the hands of the attendant of the machine.

The revolutions of the clearers $c$ $c'$ have the effect of revolving the mould and its contents about such clearers, and to cause such clearers to force their way entirely about the interior circumference of the mould, and between it and the elastic body contained therein. At the same time the crank affixed to the shaft $m'$ should be slowly rotated in the right direction, which will have the effect of driving the clearers $c$ $c'$ toward one another, (until they nearly or quite meet,) and partially or wholly through the entire length of the mould.

It will of course be apparent to intelligent readers that the effect of the action of the machine, as just described, will be to cause a partial or entire separation of the mould and its contents.

This having been accomplished, the revolution of the crank is to be reversed, the clearers retracted from contact with the mould, and the latter, with its contents, removed from the machine, when such contents may be easily and expeditiously drawn therefrom.

I would remark that the clearing-rods $c$ $c'$ may be of one and the same piece of metal with the mandrels $b$ $b'$, but, in practice, an adjustable union of the two is found desirable.

The foregoing description of the nature and construction, as well as operation of my invention, will enable mechanics of good acquirements to manufacture and use it.

Its peculiar value, however, will be manifested more particularly to persons skilled in the manufacture of vulcanized goods, and more particularly, as before premised, to persons, like myself, manufacturing elastic rolls in large numbers, and who will appreciate the great saving in time, (not to mention that of manual labor,) resulting from its adoption.

I claim as my invention, and desire to secure by Letters Patent of the United States—

1. As a machine for loosening the adhesion of vulcanized articles to their moulds, the employment of the clearing-rods $c$ $c'$, so arranged and operated as to produce this effect by their combined rotary motion and longitudinal movements; and 2. Supporting the clearing-rods $c$ $c'$ within or by means of the dually-arranged sliding head-stocks $a$ $a'$ and mandrels $b$ $b'$, or their equivalents, the head-stock and mandrels being actuated by the pinions $d$ $d'$ and pinions $l$ $l'$, or other equivalent mechanical devices, and the whole operating together, as described; and 3. The general combination and arrangement of the dually-arranged head-stocks $a$ $a'$, supported substantially as described, with the mandrels and clearers connected, as explained, the twin or dually-arranged pinions $d$ $d'$ and $l$ $l'$, and gears $g$ $g'$ and $p$ $p'$ and $q$ $q'$, the shafts $h$, $r$, $m$, and $m'$, the posts $f$ $f'$, the cradle or clutches $u$ $u'$, being adjuncts or important details of the machine, the operation and general arrangement of the above-described combination being as hereinbefore shown and elucidated.

JOEL MOULTON.

Witnesses:
GEO. A. LORING,
FRED. CURTIS.